United States Patent
Balcha

(10) Patent No.: US 10,437,487 B2
(45) Date of Patent: Oct. 8, 2019

(54) PRIORITIZED BACKUP OPERATIONS FOR VIRTUAL MACHINES

(71) Applicant: Trilio Data, Inc., Hopkinton, MA (US)

(72) Inventor: Muralidhara R. Balcha, Upton, MA (US)

(73) Assignee: Trilio Data, Inc., Framingham, MA (US)

( * ) Notice: Subject to any disclaimer, the term of this patent is extended or adjusted under 35 U.S.C. 154(b) by 0 days.

(21) Appl. No.: 15/228,663

(22) Filed: Aug. 4, 2016

(65) Prior Publication Data

US 2018/0039434 A1 Feb. 8, 2018

(51) Int. Cl.
G06F 12/00 (2006.01)
G06F 3/06 (2006.01)
G06F 9/455 (2018.01)
G06F 11/14 (2006.01)

(52) U.S. Cl.
CPC ............ *G06F 3/0619* (2013.01); *G06F 3/065* (2013.01); *G06F 3/0665* (2013.01); *G06F 3/0689* (2013.01); *G06F 9/45558* (2013.01); *G06F 11/14* (2013.01); *G06F 9/45533* (2013.01)

(58) Field of Classification Search
None
See application file for complete search history.

(56) References Cited

U.S. PATENT DOCUMENTS

| 9,417,965 | B2* | 8/2016 | Chen | G06F 11/1438 |
| 9,524,215 | B1* | 12/2016 | Khandelwal | G06F 11/1446 |
| 2013/0085999 | A1* | 4/2013 | Tung | G06F 11/1451 707/654 |
| 2016/0048408 | A1* | 2/2016 | Madhu | G06F 11/1458 718/1 |

* cited by examiner

*Primary Examiner* — John A Lane
(74) *Attorney, Agent, or Firm* — Goodwin Procter LLP

(57) ABSTRACT

A VM (Virtual Machine) backup calculates, for each of the VMs, a set of blocks corresponding to the VM for inclusion in a backup, such that the set of blocks is calculated according to a prioritized sequence of operations based on a storage array connected to the computing node. The method traverses each of the calculated set of blocks, in which the set of blocks is taken at a common point in time for each VM, and stores the traversed blocks in a backup format configured for restoring the VM corresponding to the set of blocks by restoring the blocks and corresponding blocks at the common point in time. The prioritized sequence of operations allows the most efficient approach to be attempted first, but ensuring robust coverage by attempting successive "fallback" approaches so that effective coverage of all VMs occurs.

20 Claims, 5 Drawing Sheets

PRIORITIZED BACKUP OPERATIONS FOR VIRTUAL MACHINES

BACKGROUND

Virtual computing environments allow a single physical computing node to be shared by multiple users. A hypervisor operates on each physical node and provides multiple instances of a virtual machine (VM) with a dedicated operating system (OS), file structure and applications, such that a user of the VM has the appearance that the VM is a machine dedicated to them. The actual files associated with each VM tend to form a complex arrangement that may be spread across multiple physical disks. Performing a backup involves identification of each of the files and included file blocks used by each VM, which presents a formidable computing task.

Backup vendors have attempted numerous innovations to improve these backups. Such conventional approached have relied on file timestamps or source de duplication technologies to reduce the amount of data that needs to be backup. Likewise, efforts have involved file systems that uses various de duplication technologies to discard redundant data in backup data, and ongoing reorganization of backup data in an attempt to improve efficiency of the backup.

SUMMARY

In a virtual computing environment, multiple virtual machines (VMs) execute on the same physical computing node, or host, using a hypervisor that apportions the computing resources on the computing node such that each VM has its own operating system, processor and memory. Under a hypervisor, each VM operates as if it were a separate machine, and a user of the VM has the user experience of a dedicated machine, even though the same physical computing node is shared by multiple VMs. Each VM can be defined in terms of a virtual image, which represents the computing resources used by the VM, including the applications, disk, memory and network configuration used by the VM. As with conventional computing hardware, it is important to perform backups to avoid data loss in the event of unexpected failure. However, unlike conventional computing platforms, in a virtual environment the computing environment used by a particular VM may be distributed across multiple physical machines and storage devices.

Configurations herein provide a method of backing up VMs by identifying a plurality of computing nodes, where each has at least one VM resource, and each of the VMs on a computing node are responsive to a hypervisor on that computing node. Backup logic calculates, for each of the VMs, a set of blocks corresponding to the VM for inclusion in a backup, such that the set of blocks is calculated according to a prioritized sequence of operations based on a storage array connected to the computing node. The method traverses each of the calculated set of blocks, in which the set of blocks is taken at a common point in time for each VM, and stores the traversed blocks in a backup format configured for restoring the VM corresponding to the set of blocks by restoring the blocks and corresponding files at the common point in time. The prioritized sequence of operations allows the most efficient approach to be attempted first, but ensuring robust coverage by attempting successive "fallback" approaches so that effective coverage of all VMs occurs.

A virtual machine image, or virtual image, represents a state of a VM at a particular point in time. Backup and retrieval operations need to be able to restore a VM to a particular point in time, including all distributed data and resources, otherwise an inconsistent state could exist in the restored VM. A system, method and apparatus as disclosed herein manages and performs backups of the VMs of a computing environment by identifying a snapshot of each VM and storing a virtual image of the VM at the point in time defined by the snapshot to enable consistent restoration of the VM. By performing a backup at a VM granularity, a large number of VMs can be included in a backup, and each restored to a consistent state defined by the snapshot on which the virtual image was based.

Configurations herein are based, in part, on the observation that conventional approaches to VM backup have large computational and storage requirements. Unfortunately, conventional approaches to backup in a virtual computing environment suffer from the shortcoming that the files employed for VM storage tend to be large and sparse, and result in a corresponding demand for computing resources to identify and transfer the data for storage. Accordingly, configurations herein substantially overcome the shortcomings of conventional approaches by employing a multi-tiered approach to calculating blocks (files) for backup, and employing a storage array with disks having a snapshot capability such that blocks for backup are identified by the most effective tier of a prioritized sequence of backup file calculation. Capabilities of the storage array supporting the computing nodes are evaluated, and an operation is selected for calculating the changed blocks for backup. Selection of the operation includes progressing from the fastest and most efficient approach to determine if it is applicable to the storage array and the VMs on the computing node. Successive operations are considered in a progression towards a general full disk snapshot compare, which, while effective, can be less efficient. A storage format, such as QCOW2 (QEMU Copy On Write 2), defines the storage format adaptable to blocks gathered by the progression along the prioritized sequence, so that the most efficient backup operation is commanded for each VM.

Virtual machine deployment, therefore, presents unique challenges to a conventional backup, due to the distribution and granularity of files associated with each VM. Complementing the improvements in backup technologies are standards that are evolving in the cloud and virtualization technologies to efficiently save virtual machine images. For example, virtual machine images tend to be quite sparse and these standards attempt to support storing large virtual machines images as efficiently as possible by discarding zeros. One operation that is commonly used with virtual machines is a virtual machine snapshot. A snapshot denotes all files associated with a virtual machine at a common point time, so that a subsequent restoration returns the VM to a consistent state by returning all associated files to the same point in time. Accordingly, when a virtual machine is stored as an image on a hard disk, it is also typical to save all the virtual machine snapshots that are associated with the virtual machine.

Configuration disclosed herein provides a symbiotic usage to backup technologies and virtual image storage for storing VMs, as although though these technologies have evolved independently, they are attempting to solve a common problem for providing efficient storage of large data sets and efficient storage of changes that happened to data sets at regular intervals of time.

The disclosed backup approach employs a set of operations in a prioritized order for identifying changes to be recorded/saved in a backup. Each of the operations gathers the contents of the backup in the most effective manner depending on what operation(s) are supported. The operations progress in order according to the fastest and most efficient to more robust, all-inclusive approaches which may be more burdensome in terms of processing. The priority of the operations defines the order of attempt and the speed/efficiency of each. Because the prioritized set of operations anticipates a variety of storage and file configurations, the disclosed approach is effective on any suitable virtualization implementation.

In an implementation including virtual machines, multiple levels of mapping occur from a user perspective of a file to the actual storage on physical media. Physical disks define logical volumes, which may aggregate the physical disks into a larger region and/or may define redundancy structures for recovery. A file system is mounted on a logical volume, which stores and retrieves files, each of which occupies one or more blocks. An individual VM on a hypervisor accesses the file system, which is also utilized by other VMs on the hypervisor. And the virtual environment typically includes many physical machine nodes each having a hypervisor with a number of VMs. Configurations herein operate on the principle that, even with the multiple layers of redirection described above, a backup effort can be reduced to a set of changed blocks on physical disks (spindles). In the configurations below, a set of change blocks depicting changes to a physical disk spindle is determined by the most efficient approach available. It is beneficial, however, to avoid duplication by backing up the same data multiple times. Configurations herein efficiently calculate the set of changed blocks for storing VMs without duplicating backup data.

One open standard that has evolved over the last decade to store virtual machine images is QCOW2 (QEMU Copy On Write 2). QCOW2 is the standard format for storing virtual machine images in Linux with a KVM (Kernel-based Virtual Machine) hypervisor. Configurations disclosed below employ QCOW2 as a means to store backup images (QEMU is a machine emulator and virtualizer that facilitates hypervisor communication with the VMs it supports).

A typical application in a cloud environment includes multiple virtual machines, network connectivity and additional storage devices mapped to each of these virtual machines. A cloud by definition is infinitely scalable with numerous users and compute resources. When an application invokes a backup, it needs to backup all of the resources that are related to the application: its virtual machines, network connectivity, firewall rules and storage volumes. Traditional methods of running agents in the virtual machines and then backing individual files in each of these VMs will not yield a recoverable point in time copy of the application. Further, these individual files are difficult to manage in the context of a particular point in time. In contrast, configurations herein provide a method to backup cloud applications by performing backups at the image level. It means taking a VM image in its entirety and then each volume attached to each VM in its entirety. Particular configurations of the disclosed approach employ the QCOW2 format to store each of these images.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below implement a backup operation in a virtual computing environment having a scalable number of VMs spread over a plurality of computing nodes. In a typical deployment scenario, users expect the virtual computing environment to adapt to a needed number of VMs for accommodating a demand, and a number of physical computing nodes sufficient to support the VMs. A robust backup approach needs to identify and respond to the variable number of VMs, deployed computing nodes, and storage arrays. The collection approach depicted below performs collection on an example number of VMs and compute nodes for illustration, however an actual implementation would likely entail a larger number of VMs and compute nodes. However, the collection approach operates similarly.

Figure 1:
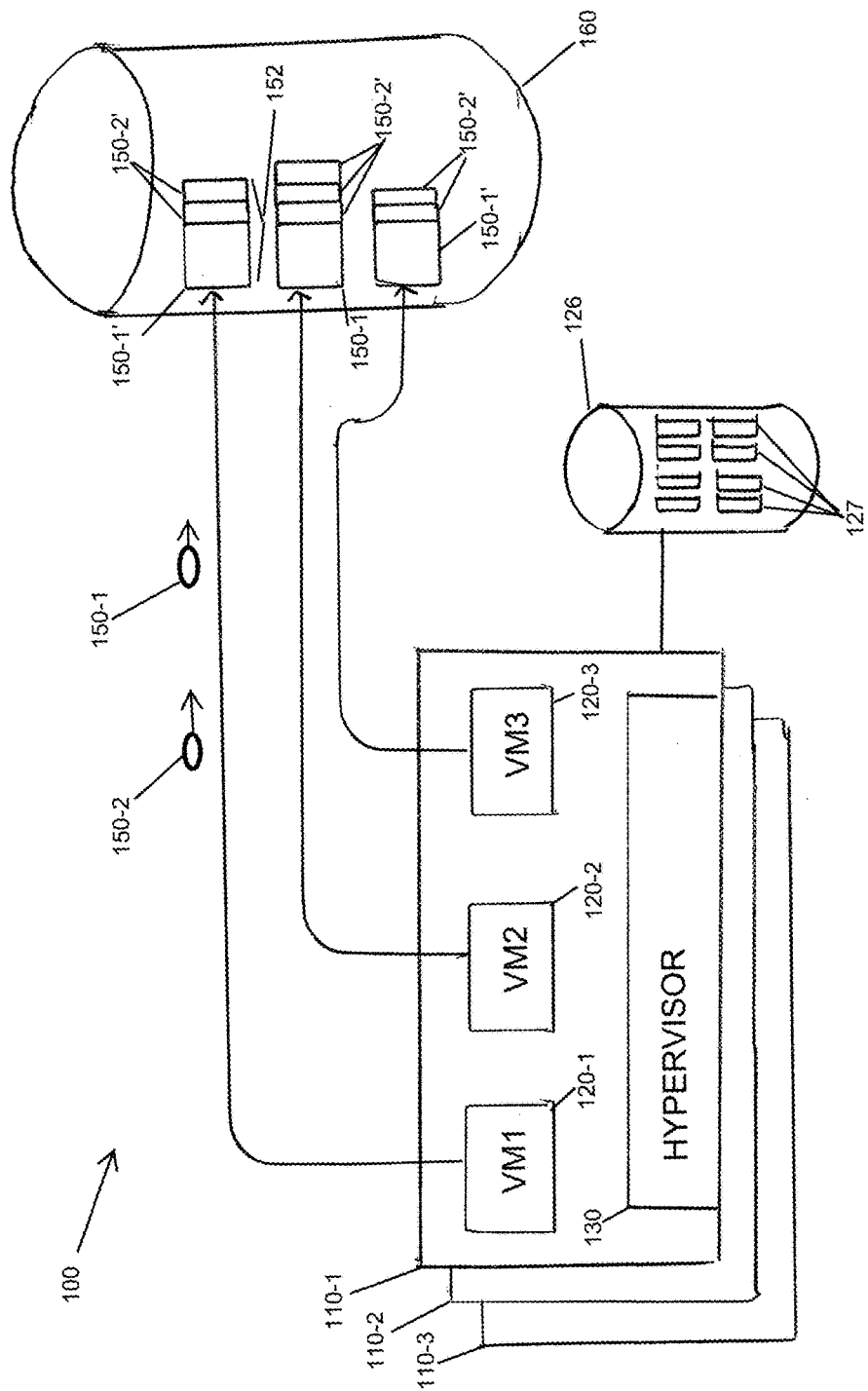
FIG. 1 is a context diagram of a virtual computing environment suitable for use with configurations herein.

FIG. 1 is a context diagram of a virtual computing environment suitable for use with configurations herein. Referring to FIG. 1, in a virtual computing environment 100, a computing node 110-1 . . . 110-3 (110 generally) having a plurality of virtual machines (VMs) 120-1 . . . 120-3 (120 generally) execute under a hypervisor 130. The hypervisor 130 provides each VM 120 with its own operating system, memory, applications and storage such that the end user perspective of the VM is similar to a dedicated machine, although multiple VMs are physically present on the same physical computing node 110 (computing node refers to a physical processor and memory (RAM)), connected to a storage array 126 having physical disks 127, and may also be referred to as a server, host or computing host. Configurations herein impose various logical transformation on each computing node 110 for allocating the computing (processor) resources, memory and storage among the VMs by mapping portions of the computing resources to each of the VMs 120.

During the backup, configurations herein compute a set of blocks (150-1 . . . 150-2, 150 generally) needed to restore the VM 130. A full backup 150-1 contains a full set of blocks needed to restore the VM 130, and an incremental backup 150-2 contains relative changes relative to the previous incremental or full backup. In either case, the backup generates a set of blocks (or files) for restoring the VM to a particular point in time. The set of blocks may also be referred to as a set of files, and the restoration referred to as a virtual image representing the stored blocks/files needed to restore the VM to the point in time represented by the backup (whether full or incremental).

The backup stores set of files 150 in a backup format 152 on a backup repository 160, which is typically cloud-based but any suitable non-volatile storage medium may suffice. Note that the backup repository 160 fulfills a different purpose and should not be confused with the file system storage allocated to the VMs, typically provided by a storage array 126 in close proximity to the computing node 110. Each VM 120 has a corresponding set of blocks 150 in the backup repository 160. Collectively, the set of blocks corresponds to a virtual image of the VM 120 from which it is derived.

The virtual image is the set of files needed to restore the VM to the point in time at which the backup was taken. The backup typically takes the form of a full backup followed by successive incremental backups depending on a policy of the virtual computing environment. Restoration includes restoring first from the full backup 150'-1 preceding the desired restoration point (point in time), and applying incremental backups 150'-2 in order up to the restoration point.

The backup identifies a plurality of computing nodes 110, each having at least one VM resource, and each of the VMs on a computing node 110 responsive to a hypervisor 130 on that computing node 110, and calculates, for each of the VMs, a set of blocks 150 corresponding to the VM 120 for inclusion in a backup, such that the set of blocks 150 is calculated according to a prioritized sequence of operations based on the storage array 126 connected to the computing node 110. The backup operation traverses each of the calculated set of blocks, in which the set of blocks represents a common point in time for each VM 120, and stores the traversed blocks in a backup format configured for restoring the VM corresponding to the set of blocks by restoring the blocks (and thus the corresponding files) at the common point in time.

It should be noted that the operation for calculating the set of blocks includes operations for determining file blocks for a full backup and determining file blocks for an incremental backup. A full backup is based on a current state of the blocks an entire disk and the incremental backup is based on blocks changed relative to a previous full backup. The discussion below is applicable to both the full and subsequent incremental backups for restoring the VM to the common point in time.

Figure 2:
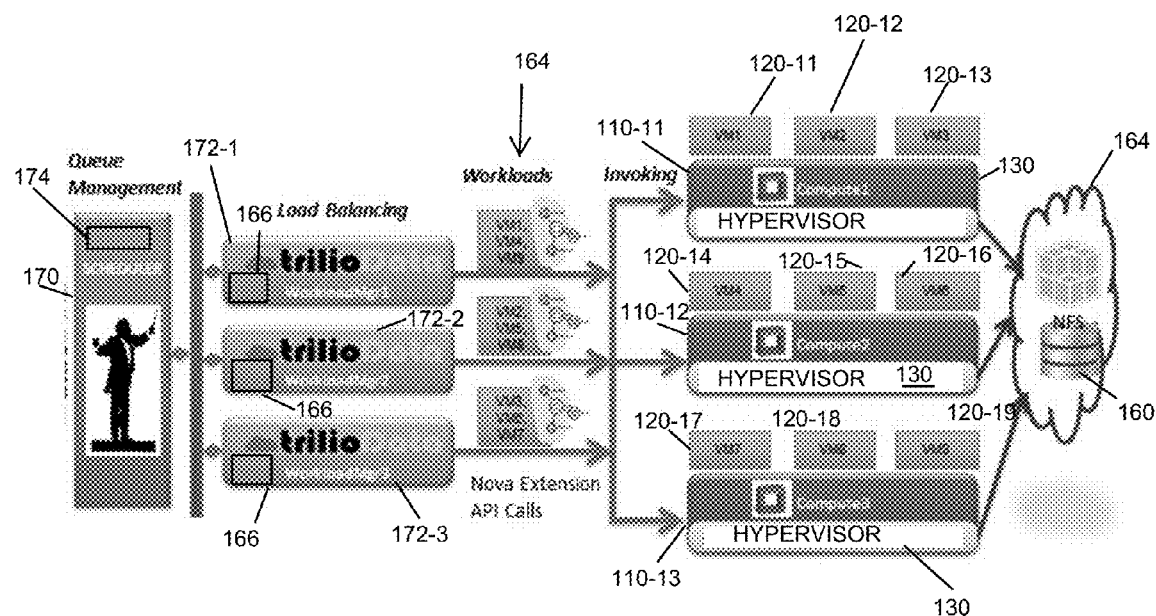
FIG. 2 shows backup operations in the environment of FIG. 1.

FIG. 2 shows backup operations in the environment of FIG. 1. Referring to FIGS. 1 and 2, the backup is overseen and managed by a scheduler 170. The scheduler distributes the backup collection effort across a plurality of backup servers 172-1 . . . 172-3 (172 generally). Load balancing logic 174 in the scheduler apportions the collection of the set of blocks 150 from each of the VMs 120-11 . . . 120-19 as workloads 164 assigned to the backup servers 172, shown as VM1 . . . VM9. The backup servers 172 traverse the VMs 120 queued in its workload 164 according to backup set calculation logic 166 executing in each backup server 172, as discussed further below. In an example configuration, the backup servers 172 may be loaded with software products marketed commercially by trilioData, of Hopkinton Mass., embodying the backup set calculation logic 166 and load balancing logic 174. The resulting set of blocks 150 is stored in the backup repository 160, typically based in a cloud 164 or Internet form, as described in FIG. 1. Each VM 120 has one or more corresponding volumes, in which the volume is supported by a storage array 126 having a plurality of disks 127. Commencing the backup further includes selecting an operation from the prioritized sequence of operations based upon the snapshot capabilities of the supporting storage array 126.

In the example arrangement, the prioritized sequence of operations includes access directly to the storage API, guest assisted change block tracking (CBT) using a guest in each hypervisor, file system assisted CBT using an allocation table, and finally, a comprehensive full disk comparison snapshot for identifying changed blocks. Direct invocation of the storage API is the first operation on the prioritized list, and provides a list of changed blocks for each storage array (disk). If not supported, then if a quest agent (QEMU guest agent, in the example configuration) is invoked to track changes between backup points. The third operation is to access the file system and identify changed blocks by comparison of allocated blocks based on a file system allocation bitmap. Finally, a full disk comparison is performed using a full snapshot, if none of the previous operations prevail. Each of these operations is discussed in further detail below with respect to FIGS. 5a-5c.

Figure 3:
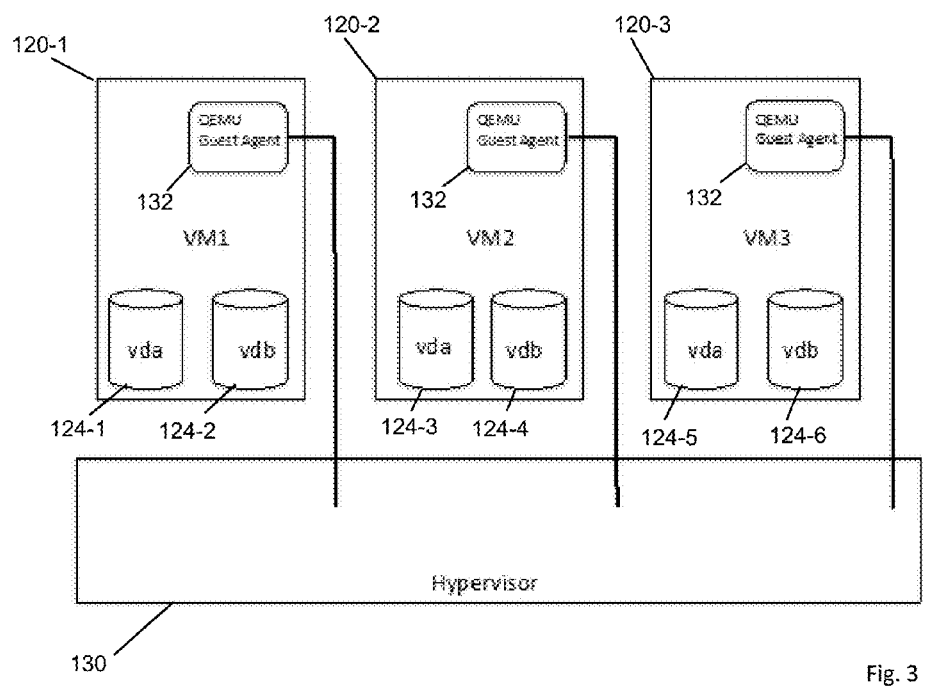
FIG. 3 shows a VM in FIG. 2 in greater detail.

FIG. 3 shows a VM 120 in FIG. 2 in greater detail. Referring to FIGS. 2 and 3, the hypervisor 130 communicates with a guest 132 in each VM 120. The guest may take the form of an agent, process, thread, or other suitable entity responsive to the hypervisor 130 and operable to issue commands to the VM 120. In commencing a backup, the backup servers 172 identify the hypervisor guest 132 in each VM 120, in which the hypervisor guest 132 is responsive to the hypervisor 130 for issuing commands to the VM 120. The backup servers 172 communicate with the hypervisor guest 132 for receiving the traversed blocks for storage. Each VM 120 also has storage in the form of a virtual disk 124-1 . . . 124-N (124 generally). The virtual disk may take the form of a file system on a partition or a logical volume, discussed further below. In either event, the logical volume represents storage available to the VM for applications executing on it—it is the "disk" of the virtual machine and is physically stored on the storage array 126 proximate to the computing node 110, in contrast to the backup repository 160.

A brief description of the hypervisor 130, VMs 120, guests 132 and the interaction between hypervisor 130 and the guests 132 facilitates description of the mechanism employed to take backup of VMs 120 running on the hypervisor 130. In particular configurations, a Linux based KVM as hypervisor is employed, but similar mechanisms exists for other hypervisors such as VMware® and Hyper-V® may be employed. Each guest 132 runs as agent called QEMU guest agent, a piece of software that is beneficial to KVM hypervisors. The guest agents implement commands invokable from the hypervisor 130. The hypervisor 130 communicates with guest agent through a virtio-serial interface that each guest 132 supports.

As cloud applications tend to be complex with multiple virtual machines and multiple storage devices, it is not practical to run custom code to take backups of individual VMs. A preferable approach to backup such applications, and to avoid executing custom code in the guest, is to leverage the hypervisor infrastructure to backup these complex applications. The hypervisor infrastructure includes communicating with the guest agent running in each guest 132 and create backup images of each VM resource. Configurations herein employ communication with the guest agent to accomplish the backup of each VM resource, resulting in an approach that is highly scalable and easy to maintain.

The disclosed approach to cloud backups employs a logical environment snapshot. The logical environment snapshot includes VM images, storage volume images and network settings of the given application. One challenge is to create images of VMs 120 and storage volumes and the backup relies on creation of storage volume images irrespective how each of these volumes is used in the guest 132. A further feature is a multi-tenancy feature, which includes associating, with each VM, a tenant, such as a department, business unit, or other group of users. The backups corresponding to each tenant maintain a distinction from backups of other tenants. The servers 172 perform the backup for each VM 120 on a first computing node and associated with a first tenant, and perform the backup for a VM associated with the first tenant on a second compute node before performing the backup for a VM associated with a second tenant on the first computing node, to ensure tenancy distinctions.

Figure 4A:
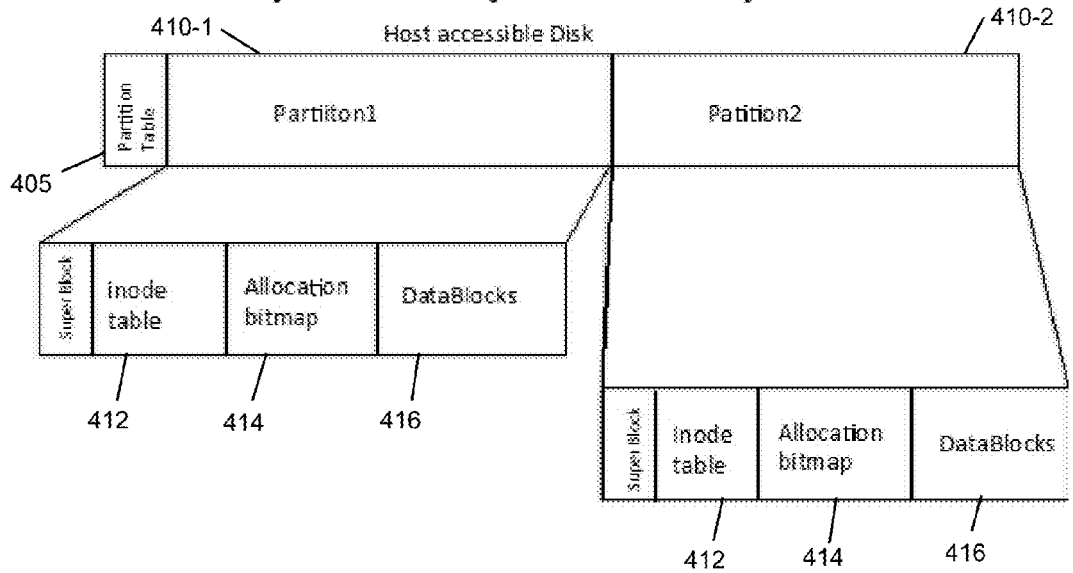
FIG. 4*a* shows a partition based file system layout on a disk associated with a VM in FIG. 3.
Figure 4B:
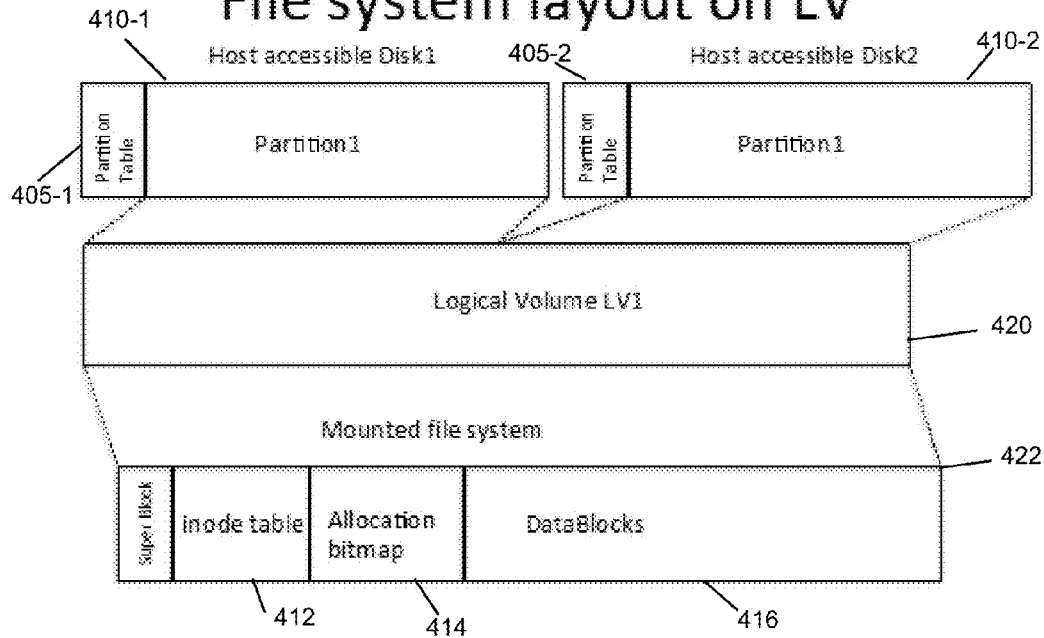
FIG. 4*b* shows a logical volume (LV) based file system layout on a disk associated with a FM in FIG. 3.

FIG. 4a shows a partition based file system layout on a disk associated with a VM in FIG. 3, and FIG. 4b shows a logical volume (LV) based file system layout on a disk associated with a VM as in FIG. 3. Referring to FIGS. 4a and 4b, each partition represents a storage structure accessible as if it were a separate device. In FIG. 4a, a partition table 405 defines two partitions 410-1, 410-2 (410 generally), each of which includes an inode table 412 (such as metadata), an allocation bitmap 414 representing disk sector/block occupancy, and the actual data blocks 416. For the structure in FIG. 4a, the backup defines an image file of the disk that includes the partition table 405 and two file systems of each partition 410.

In FIG. 4b, each partition 410 has its own partition table, and both map to the same logical volume 420. The resulting mounted file system 422 includes a common inode table 412, allocation bitmap 414, and the data blocks 416. In this backup case, the backup generates two images that correspond to two disks, representing each partition that hosts a logical volume LV1 and a file system. The backup set calculation logic 166 flow of FIG. 5 treats these structures accordingly. The allocation bitmap and inode table are used below in FIG. 5 for identifying the changed block set. The allocation bitmap indicates allocated blocks on each disk (spindle), and the inode table is accessible for determining timestamps of blocks to identify changes.

Figure 5A:
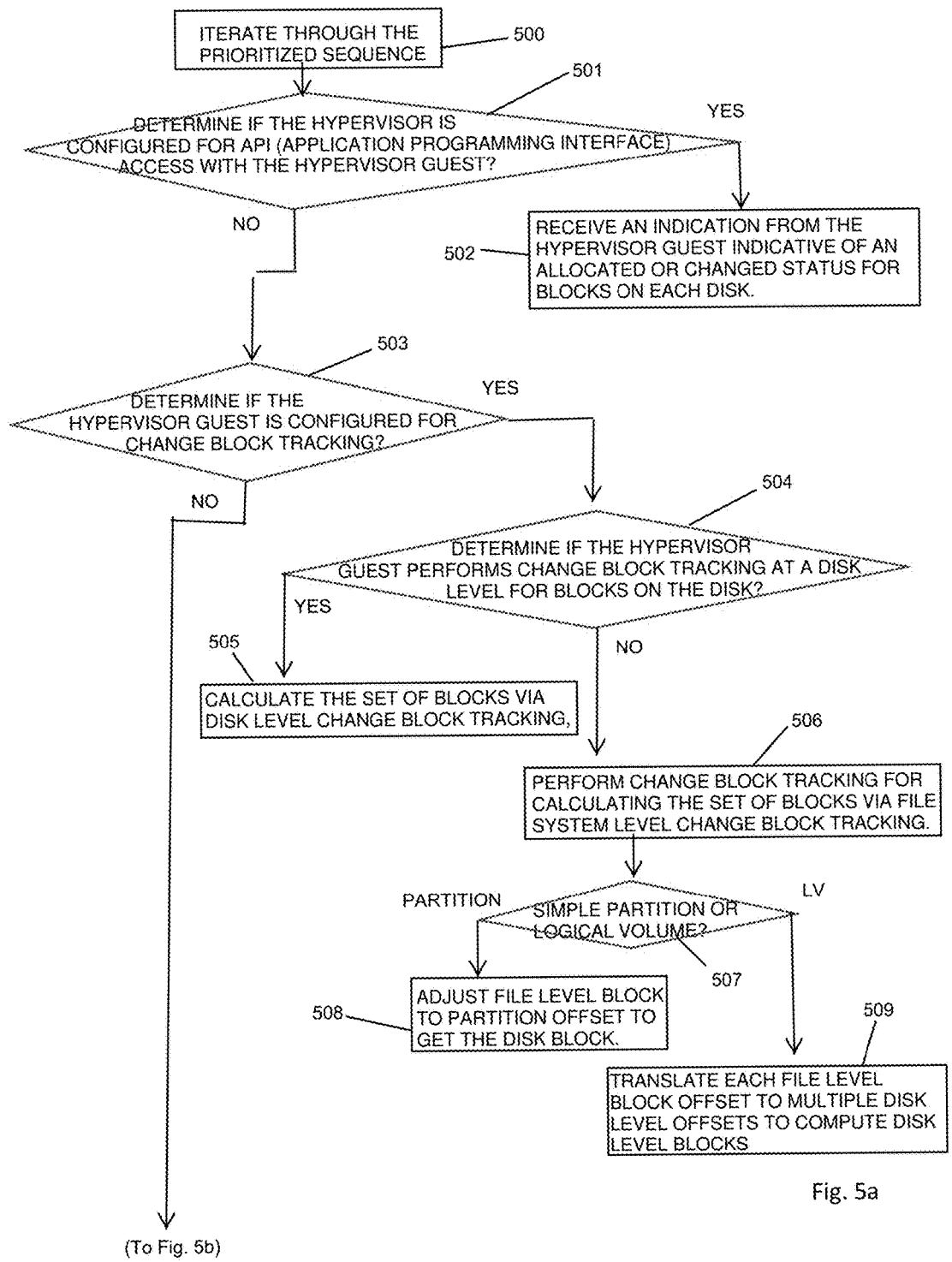
FIGS. 5*a* and 5*b* show a flowchart of data collection during backup operations as in FIG. 2.
Figure 5B:
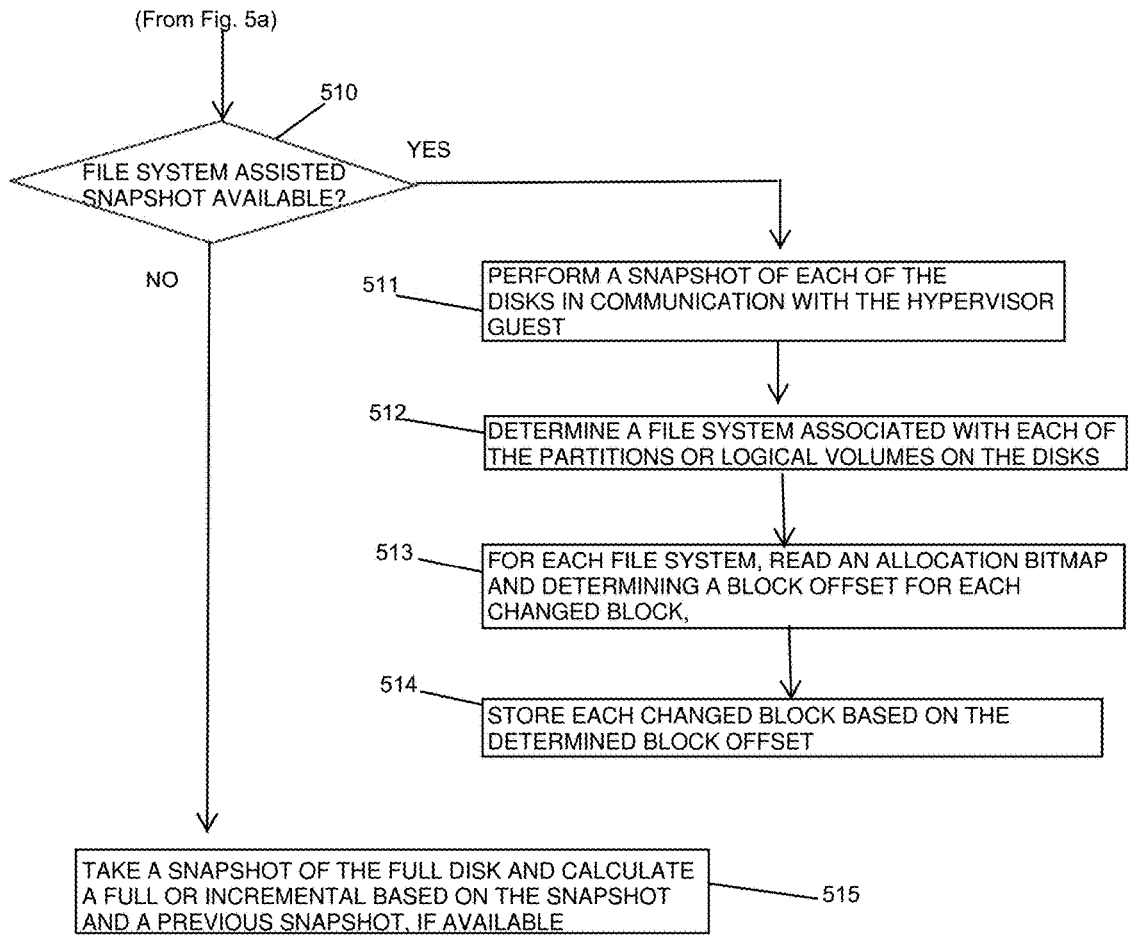

FIGS. 5a and 5b shows a flowchart of data collection during backup operations as in FIG. 2. Referring to FIGS. 2 and 5a-b, the flowchart of FIG. 5a-b depicts the backup set calculation logic 166 for calculating or determining the set of blocks 150 gathered during collection (it should be noted that while "blocks" is employed as the unit of change triggering backup designation for collection, a file is simply an ordered aggregation of one or more blocks).

In the example configuration depicted, the backup format defining the set of blocks 150 for backup is QCOW2, and the hypervisor is KVM. Other file formats and hypervisors may be utilized in the virtual computing environment for performing the disclosed approach. The backup set calculation logic 166 defines a multi-pronged approach to efficiently calculate QCOW2 from the cloud application resources. This approach leverages available mechanisms that exist in the hypervisor to perform an efficient backup. A particular feature of the underlying storage array 126 is the support of disk level snapshots, which is invoked by the backup set calculation logic 166 to calculate QCOW2 images of each disk mapped to VMs.

In the approach of FIGS. 5a-b, a prioritized sequence of operations are attempted for calculating the set of blocks 150 for backup, progressing from the most efficient and fastest to more comprehensive analysis and determinations available, depending on the hypervisor, file systems employed by the VMs 120, and capabilities of the storage array 126 supporting the VMs 120. The approach of FIG. 5 is employed by the backup servers 172 by executing the backup set calculation logic 166 in the virtual computing environment 100. Each of the backup servers 172, computing nodes 110, storage array 126 and backup repository 160 are coupled by adequate wired or wireless networking connections for communication as described herein.

The backup set calculation logic 166 begins iterating through the prioritized sequence, as depicted at step 500, and first attempts to invoke KVM based mechanisms to calculate blocks allocated by the hypervisor 130 and leverage storage array assisted APIs to calculate blocks allocated or changed between backups. The backup determines if the hypervisor 130 is configured for API (Application Programming Interface) access with the hypervisor guest 132, as shown at step 501. If so, the backup server 172 receives an indication from the hypervisor guest 132 indicative of an allocated or changed status for blocks on each disk 127, as shown at step 502. For storage assisted APIs, a full backup may be performed as follows:
1. Call storage API to perform disk snapshot.
2. Call underlying storage API to get the allocated blocks for volume1 snapshot1.
3. Create host accessible path to snapshot1.
4. Create a sparse file of size volume1.
5. For each block in allocated blocks {seek to block offset in sparse file, copy data (volume snapshot, sparse file, block size)}.
6. Convert sparse file to qcow2 file using "qemu-img-convert" command.
7. Copy the qcow2 file to backup media.

A subsequent incremental follows this full backup by:
1. Take snapshot of the volume1 using storage API.
2. Call storage API to find the difference of blocks between snapshot1 and snapshot2.
3. Create a sparse file of size volume1.
4. Create a host addressable path to snapshot2.
5. For each block in changed blocks {seek to block offset in sparse file, seek to block offset in snapshot 2 device, copy data (snapshot2, sparse file, block size)}.
6. Convert sparse file to qcow2 file.
7. Create backing file of qcow2 file to previous backup file.
8. Copy qcow2 file to backup media.

This operation leverages the API in storage arrays that are recognized by the backup server 172 and the backup set calculation logic 166.

In some cases, either KVM based mechanisms or storage array assisted APIs are not available to efficiently calculate the changes between two backups. A second tier in the prioritized approach is to leverage a driver module in each VM 120 to track changes to each individual disk 127 that is assigned to the VM. This approach is called guest assisted change block tracking. This backup mechanism tracks these blocks in tandem with storage array based snapshots to efficiently calculate QCOW2 images for backup. Accordingly, the backup server 172 determines if the hypervisor guest is configured for change block tracking, as depicted at step 503.

If change block tracking is applicable, there are two ways to track changes in the guest. One approach is to track changes at each disk level. Disk level tracking is more efficient and each disk block can be easily mapped to underlying storage array based disk block. Accordingly, the backup server 172 determines if the hypervisor guest 132 is operable to perform change block tracking at a disk level for blocks on the disk, as depicted at step 504, and if so, calculates the set of blocks via disk level change block tracking, as disclosed at step 505.

In guest assisted change block tracking, a generic block driver that tracks changed blocks is installed in the quest and has the ability to track block changes to every disk assigned to the guest. Therefore, while the storage API may not be available as above, the quest driver (QEMU guest in the example configuration) may be leveraged to avoid manually iterating through each changed block candidate. In this operation:

The command line interface is assumed
guest-cbt start-cbt <devname> <filename>
Starts the cbt on a given device recording indexes of each block that is changed to <filename>.
guest-cbt switch-cbt <devname> <new-filename>
Automatically switches the cbt tracking filename from existing filename to new filename.
guest-cbt cancel-cbt <devname>
Cancels cbt on a given device.

We expect that this command line is executed through the qemu agent using the guest-exec command.

In tracking the changed blocks, the guest is invoked to track changes between points in time. However, these points may not exactly align with generated snapshots from the storage array. The gathered change block set needs to identify any discrepancies between blocks in the snapshot and blocks tracked by the guest.

Full and incremental change block sets may be generated as follows

Full Backup:
From the hypervisor invoke guest-exec "guest-cbt start-cbt vda/vda.1". Repeat the process for all devices assigned to the guest.
Take disk vda snapshot using storage API. Repeat the process for all disks assigned to the guest.
From hypervisor invoke guest-exec "guest-cbt switch-cbt vda/vda.2". Repeat this step for all disks mapped to guest.
Assign host addressable device path to vda snapshot. Using "qemu-img-convert" command to convert the raw disk to qcow2 file. Repeat this step for all disks assigned to guest.
Copy all qcow2 images to backup media.

Incremental:
1. From hypervisor invoke guest-exec "guest-cbt switch-cbt vda/vda.3". Repeat this step for all disks mapped to guest.
2. Take disk vda snapshot using storage API. Call the snapshot vda.snap. Repeat this process for all disks assigned to the guest.
3. From hypervisor invoke guest-exec "guest-cbt switch-cbt vda/vda.4". Repeat this step for all disks mapped to guest.
4. Assign host addressable device path to vda snapshot. Using "qemu-img-convert" command to convert the raw disk to qcow2 file. Repeat this step for all disks assigned to guest.
5. Combine changed block indexes recorded in vda.1, vda.2, and vda.3 into vda.cbt.
6. Create sparse file of size vda.
7. For each block identified in vda.cbt: {
  1. Read the block from vda.snap.
  2. Seek to block offset in sparse file.
  3. Write the block to sparse file.}
8. Convert the sparse file to qcow2 file using "qemu-img-convert" command.
9. Write the qcow2 file to backup media.

Repeat steps 4-9 for all other disks mapped to the guest.

If disk level change block tracking is not available, at step 504, then the backup server 172 performs change block tracking for calculating the set of blocks via file system level change block tracking, as depicted at step 506. As indicated above, a VM implementation generally imposes a layered mapping structure that identifies logical volumes on physical spindles, and a file system on the logical volume. While slightly less efficient, due to additional mapping, effective computation of the change set of blocks 152 is still achieved. The file system is a higher-level abstraction than a disk; the level block changes need to be translated to disk level blocks. Depending on the level of abstraction, this mapping may become complex. For example, a file system can be mounted on a simple partition on a disk. In such a case, each file level block needs to be adjusted to a partition offset to get the disk block, as shown at step 508. In the example configuration, full change block sets may be accumulated as follows:

Assuming a driver that tracks changed blocks is installed in the guest and has the ability to track block changes to every file system mounted on the guest.

The command line interface is assumed.
guest-fs-cbt start-cbt <mountpath> <filename in the file system>
Starts the cbt on a given file system recording indexes of each block that is changed to <filename>.
guest-fs-cbt switch-cbt <mountpath> <new-filename>
Automatically switches the cbt tracking filename from existing filename to new filename.
guest-fs-cbt cancel-cbt <mountpath>
Cancels cbt on a given mountpath.

We expect that this command line is executed thru the qemu agent using guest-exec command.

Then, if the file system is mounted on a regular partition at step 508, a full backup includes:
1. From the hypervisor invoke "guest-get-fsinfo" to get the list of file systems mounted on the guest.
2. From the hypervisor invoke guest-exec "guest-fs-cbt start-cbt/var/mnt1/var/mnt1/mnt.1" for every file system on vda assuming that /var/mnt1 is the mount point of the file system.
3. Repeat step 2 for all disks assigned to the guest.
4. Take disk vda snapshot using storage API. Repeat this process for all disks assigned to the guest.
5. From hypervisor invoke guest-exec "guest-fs-cbt switch-cbt/var/mnt1/var/mnt1/mnt.2". Repeat this step for all file systems mounted on vda disk.
6. Repeat step 4 for all disks mapped to guest.
7. Create a sparse file the size of vda.
8. Assign host addressable device path to vda snapshot.
9. For each file system on vda:
  1. Read the allocated bitmap.
  2. For each bit set in allocated bit:
    1. Calculate block number of the corresponding bit.
    2. Translate the block offset with respect to the partition on vda.
    3. Translate the block offset of partition to vda.
    4. Read the block from vda snapshot.
    5. Seek into sparse file at block offset into vda.
    6. Copy block data to sparse file.
10. Use "qemu-img-convert" command to convert the sparse file to qcow2 file. Delete sparse file
11. Copy the qcow2 file to backup media.
12. Repeat the steps 7-11 for all disks assigned to guest.

and an incremental performed as follows:
1. From hypervisor invoke guest-exec "guest-fs-cbt switch-cbt/var/mnt1/var/mnt1/mnt1.3". Repeat for all the file systems on vda.
2. Repeat step 1 for all disks mapped to guest.

3. Take disk vda snapshot using storage API. Call the snapshot vda.snap. Repeat this step for all disks assigned to the guest.
4. From hypervisor invoke guest-exec "guest-fs-cbt switch-cbt/var/mnt1/var/mnt1/mnt1.4". Repeat this step for all file systems mounted on vda.
5. Repeat step 4 for all disks mapped to guest.
6. Assign host addressable device path to vda snapshot.
7. Create sparse file of size vda.
8. For each file system mnt on vda: {
   1. Combine changed block indexes recorded in mnt.1, mnt.2 and mnt.3 into mnt.cbt.
   2. For each block index in mnt.cbt: {
      1. Convert block index into partition offset.
      2. Convert partition offset into disk offset.
      3. Seek disk offset in sparse file.
      4. Seek to disk offset in vda snapshot.
   3. Copy block from vda snapshot to sparse file.}
   4. Delete mnt.cbt and mnt.1.}
9. Convert the sparse file to qcow2 file using "qemu-img-convert" command.
10. Write the qcow2 file to backup media.
11. Delete sparse file.
12. Repeat steps 6-11 for all other disks mapped to the guest.

As indicated above, if interaction with the file system is through a logical volume, additional mapping is required to identify an actual offset for each physical block. If the file system is mounted on a logical volume and each logical volume is composed of various physical disk extents, then translating each file level block offset to multiple disk level offsets is a multistep process, as depicted at step 509. Calculation of a physical disk block is mapped via a partition table. Further, multiple file systems may reside on multiple physical disk extents. The disclosed approach, however, calculates individual disk QCOW2 images irrespective how each of these file systems are mounted on these physical disks. Accordingly, full and incremental change block sets are computed as follows:

1. From the hypervisor invoke "guest-get-fsinfo" to get the list of the file systems mounted on the guest.
2. From the hypervisor invoke guest-exec to run "lvs" command to get the list of logical volumes in the guest.
3. From the hypervisor invoke guest-exec "guest-fs-cbt start-cbt/var/mnt1/var/mnt1/mnt.1" where/var/mnt1 is the mount point of the first file system. Repeat this step for every file system.
4. Take disk vda snapshot using storage API. Repeat this step for all disks assigned to the guest.
5. From hypervisor invoke guest-exec "guest-fs-cbt switch-cbt/var/mnt1/var/mnt1/mnt.2". Repeat this step for all file systems mounted on logical volumes.
6. For each disk mapped to the guest: {
   1. Create a sparse file the size of disk.}
7. For each disk mapped to the guest: {
   1. Assign host addressable device path to disk snapshot.}
8. For each file system on the guest: {
   1. Read the allocated bit map.
   2. For each bit set in allocated bit: {
      1. Calculate block number of the corresponding bit.
      2. Translate the block offset with respect to logical volume.
      3. Translate the block offset to the underlying physical disk.
      4. Read the block from corresponding disk.
      5. Seek into corresponding sparse file at block offset.
      6. Copy block data to corresponding sparse file.}
9. Use "qemu-img-convert" command to convert all sparse files to qcow2 files. Delete all sparse files.
10. Copy the qcow2 files to backup media.

And for the incremental:
1. From hypervisor invoke guest-exec "guest-fs-cbt switch-cbt/var/mnt1/var/mnt1/mnt1.3" where/var/mnt1 is the mount point of the first file system.
2. Repeat step 1 for all file systems in the guest.
3. Take disk vda snapshot using storage API. Call the snapshot vda.snap. Repeat this step for all disks assigned to the guest.
4. From hypervisor invoke guest-exec "guest-fs-cbt switch-cbt/var/mnt1/var/mnt1/mnt1.4". Repeat this step for all the file systems mounted in the guest.
5. Assign host addressable device path to vda snapshot. Repeat this step for all disks in guest.
6. Create sparse file of size vda. Create sparse files for all other disks in the guest.
7. For each file system mnt in the guest: {
   1. Combine changed block indexes recorded in mnt.1, mnt.2 and mnt.3 into mnt.cbt.
   2. For each block index in mnt.cbt: {
      1. Convert block index into logical volume offset.
      2. Convert logical volume offset into one of the underlying disk offset.
      3. Seek to disk offset in corresponding sparse file.
      4. Seek to disk offset in corresponding disk snapshot.
   3. Copy block from disk snapshot to sparse file.}
   4. Delete mnt.cbt and mnt.1.}
8. Convert all sparse files to qcow2 files using "qemu-img-convert" command.
9. Write the qcow2 files to backup media.

If the change block tracking using the guest is not available, then comparisons of allocated blocks using the file allocation bitmap tables is pursued. If the check at step 503 is negative for change block tracking, a successive prioritized operation employs snapshots of the disks attached to a guest. The server 172 discovers disk partitions and logical volumes on the disk snapshots, and determines the file systems mounted on each of these partitions or logical volumes. The file system allocation bitmap 414 is read, and for each bit set in the bitmap, the server 172 determines a block offset with respect to either partition or logical volume based on the underlying device for the file system. It then translate the block offset to respective disk offset and create QCOW2 images for each disk that is mapped to guest. Scanning thru the bitmap and backing all blocks that were allocated becomes a full backup. For incremental backups, the server 172 compares the allocated block with the corresponding block in the previous snapshot. If the blocks are changed, then the block is included in the set of blocks 152 for backup. The following steps illustrate a particular example implementation; for a full backup:

1. From the hypervisor invoke "guest-get-fsinfo" to get the list of file systems mounted on the guest.
2. Take disk vda snapshot using storage API. Repeat this process for all disks assigned to the guest.
3. Create a sparse file the size of vda. Repeat this step for every other disk in the guest.
4. Assign host addressable device path to vda snapshot.
5. Repeat steps 3-4 for all other disks in the guest.
6. For each file system:
   1. Read the allocated bitmap.
   2. For each bit set in allocated bit:
      1. Calculate block number of the corresponding bit.

2. Translate the block offset to the respective disk offset. This step may include translating thru any logical volumes in between.
3. Read the block from corresponding disk snapshot.
4. Seek into corresponding sparse file at block offset.
5. Copy block data to sparse file.
7. Using "qemu-img-convert" command to convert all sparse files to qcow2 files.
8. Delete all sparse files.
9. Copy all qcow2 files to back up media.
And for an incremental:
1. From the hypervisor invoke "guest-get-fsinfo" to get the list of file systems mounted on the guest.
2. Take disk vda snapshot using storage API. Repeat the process for all disks assigned to the guest.
3. Create a sparse file the size of vda. Repeat the step for every other disk in the guest.
4. Assign host addressable device path to vda snapshot.
5. Repeat steps 3-4 for all other disks in the guest.
6. For each file system:
   1. Read the allocated bitmap.
   2. For each bit set in allocated bit:
      1. Calculate block number of the corresponding bit,
      2. Translate the block offset to respective disk offset. This step may include translating thru any logical volumes in between,
      3. Read the block from corresponding disk current snapshot,
      4. Read the block from corresponding disk previous snapshot
      5. If the data does not match: {
         1. Seek into corresponding sparse file at block offset,
         2. Copy block data to sparse file.}
7. Using "qemu-img-convert" command to convert all sparse files to qcow2 files. Delete all sparse files.
8. Copy all qcow2 files to backup media.

A variant to this approach is to compare file timestamps. We compare the timestamps of the files in the older snapshot and recent snapshot, including timestamp information from the inode table, where applicable. If the time stamp has changed for the file, we compare the block allocation of the file and backup the data that is changed between two snapshots.

Accordingly, based on the determination of whether the hypervisor guest is configured for change block tracking at step 503, and following the check at step 510 the server 172 performs a snapshot of each of the disks in communication with the hypervisor guest, as depicted at step 511. The backup server 172 determines a file system associated with each of the partitions or logical volumes on the disks 127, as shown at step 512. For each file system, the server 172 reads the allocation bitmap 410 and determining a block offset for each changed block, at step 513, and stores each changed block based on the determined block offset, as depicted at step 514.

If no file system assisted snapshot is available, at step 510, control passes to step 515 as the "fallback" approach. When none of the above approaches are able to identify the changed set of blocks 152, a comprehensive, all-encompassing "brute force" approach may be employed to calculate backup of guest-mapped disks. If the hypervisor guest 132 is unable to determine the changed blocks, the server 172 proceeds to take a snapshot of the full disk and calculates a full or incremental backup file set 150 based on the snapshot and a previous snapshot, if available, as depicted at step 515. For a full backup, this includes a snapshot of each disk 127. The server 172 then creates a host addressable device path name for the snapshot and then execute "qemu-img convert" command to convert the raw disk to a QCOW2 file. The server copies the QCOW2 file to backup media. For incremental backup, the snapshot of previous backup and snapshot from current backup job is used. The server 172 creates host addressable device path to previous snapshot and current snapshot. The server 127 then compares the disk blocks of each snapshot and creates a QCOW2 image with the blocks that are changed between snapshots. The server 172 then copies the QCOW2 image containing the set of blocks 150 to the backup repository 160.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a virtual computing environment, a method of backing up VMs (virtual machines), comprising:
   identifying a plurality of computing nodes, each having at least one VM, each of the VMs responsive to a hypervisor operating on one or more of the plurality of computing nodes;
   determining, for each of the VMs, a set of file blocks corresponding to one or more of the VMs for inclusion in a backup operation comprising at least one of a full backup and an incremental backup for restoring each of the VMs, the set of file blocks identified according to a prioritized sequence of operations based on a storage array connected to one or more of the plurality of computing nodes, wherein one operation of the prioritized sequence of operations comprises:
   identifying a list of changed file blocks included in the storage array and;
   invoking a hypervisor guest installed on one or more of the VMs to track changes between backup points to identify changed file blocks;
   responsive to identifying the changed file blocks, identifying the set of file blocks associated with the changed file blocks, the set of the blocks selected at a common point in time associated with each of the VMs; and
   storing the set of file blocks in a backup format, the backup format configured for restoring one or more of the VMs corresponding to the set of file blocks to a same point in time.

2. The method of claim 1 further comprising:
   identifying the hypervisor guest in each of the VMs, the hypervisor guest responsive to the hypervisor for issuing commands to each of the VMs; and
   communicating with the hypervisor guest for receiving the identified set of file blocks for storage.

3. The method of claim 2 wherein each of the VMs has a corresponding volume supported by the storage array having a plurality of disks, and further comprising selecting an operation from the prioritized sequence of operations based upon snapshot capabilities of the storage array.

4. The method of claim 3 further comprising:
   associating, with each of the VMs, a tenant; and
   performing the backup operation for one or more VMs associated with a first tenant on a first computing node before performing the backup operation for one or more VMs associated with a second tenant on the first computing node.

5. The method of claim 2 further comprising:
   iterating through the prioritized sequence of operations;
   determining whether the hypervisor guest is configured for change block tracking, and if so;
   determining whether the hypervisor guest performs change block tracking at a disk level for the file blocks on a disk, and identifying the set of file blocks via disk level change block tracking, and if not;
   performing change block tracking for identifying the set of file blocks via file system level change block tracking.

6. The method of claim 5 further comprising, based on the determination of whether the hypervisor guest is configured for change block tracking, performing a snapshot of each of a plurality of disks in communication with the hypervisor guest;
   determining a file system associated with each partition or logical volumes on the plurality of disks;
   for each file system, reading an allocation bitmap and determining a block offset for each changed block, and storing each changed block based on the determined block offset.

7. The method of claim 5 further comprising, when the hypervisor guest is unable to determine the changed blocks, performing the snapshot and identifying whether a full or incremental change has occurred based on at least one of the snapshot and a previous snapshot.

8. The method of claim 6 wherein identifying the set of blocks further includes determining the file blocks for the full backup and determining one or more of the file blocks for the incremental backup, and wherein the full backup is based on a current state of the file blocks of the plurality of disks, and the incremental backup is based on file blocks changed relative to a previous full backup.

9. The method of claim 6 wherein the backup format is QCOW2 and the hypervisor is a KVM (Kernel-based Virtual Machine), and further comprising determining the hypervisor is configured for API access with the hypervisor guest and responsive to determining the hypervisor is configured for API access with the hypervisor guest:
   performing a snapshot of the disk;
   obtaining allocated blocks for a first volume and the snapshot;
   creating a host accessible path to the snapshot;
   for each block in the allocated blocks, blocking an offset in a sparse file;
   copying the snapshot, sparse file and the block size; and
   converting the sparse file to the QCOW2 backup format.

10. The method of claim 1 further comprising:
    determining whether the hypervisor is configured for API (Application Programming Interface) access with a storage system API; and
    responsive to determining the hypervisor is configured for API access, receiving an indication from the storage system API indicative of an allocated or changed status for the file blocks on each disk.

11. The method of claim 1 further comprising selecting each of the prioritized sequence of operations, in order, based on whether a preceding operation in the sequence of operations was able to identify the set of file blocks, the prioritized sequence of operations comprising:
    determining whether the hypervisor is configured for API (Application Programming Interface) access with a hypervisor guest, and, responsive to determining the hypervisor is configured for API access with the hypervisor guest, receiving an indication from a hypervisor guest indicative of an allocated or changed status for the file blocks on each disk; and
    when the API access does not yield the set of file blocks, determining whether the hypervisor guest is configured for change block tracking; and when the hypervisor guest is configured for change block tracking, determining whether the hypervisor guest performs change block tracking at a disk level for file blocks on the disk, and identifying the set of blocks via disk level change block tracking, and when disk level tracking is not available, performing change block tracking for identifying the set of blocks via file system level change block tracking; and
    when change block tracking does not yield the set of file blocks, attempting to perform a snapshot of each of the disks in communication with the hypervisor guest, determining a file system associated with each of the partitions or logical volumes on the disks, for each file system, reading an allocation bitmap and determining a block offset for each changed file block, and storing each changed the block based on the determined block offset; and
    when performing a snapshot of each of the disks in communication with the hypervisor guest did not yield the set of file blocks, performing the snapshot of the full disk and identifying whether the full or incremental change has occurred based on at least one of the snapshot and a previous snapshot.

12. A VM (virtual machine), backup server device, comprising:
    an interface for identifying a plurality of computing nodes, each having at least one VM, each of the VMs responsive to a hypervisor operating on one or more of a plurality of computing nodes;
    backup set logic configured to determine, for each of the VMs, a set of file blocks corresponding to the one or more of the VMs for inclusion in a backup operation comprising at least one of a full backup and an incremental backup for restoring each of the VMs, the set of file blocks identified according to a prioritized sequence of operations based on a storage array connected to one or more of the plurality of computing nodes wherein one operation of the prioritized sequence of operations comprises the backup set logic being configured to: identify a list of changed file blocks included in the storage array; and invoke a hypervisor guest installed on one or more of the VMs to track changes between backup points to identify changed file blocks;

an interface to a storage array configured to, responsive to identification of the changed file blocks, identify the set of file blocks associated with the changed file blocks, the set of file blocks selected at a common point in time associated with each of the VMs; and a backup repository configured to store the set of file blocks in a backup format, the backup format configured to restore the VMs corresponding to the set of file blocks to a same point in time.

13. The VM backup server device of claim 12, wherein the backup set logic is further configured to:

identify the hypervisor guest in each of the VMs, the hypervisor guest responsive to the hypervisor for issuing commands to each of the VMs; and communicate with the hypervisor guest to receive the identified set of file blocks for storage.

14. The VM backup server device of claim 13 wherein each of the VMs has a corresponding volume supported by the storage array having a plurality of disks, and the backup set logic is further configured to select an operation from the prioritized sequence of operations based upon snapshot capabilities of the storage array.

15. The VM backup server device of claim 14 wherein the VM backup server device is further configured to:

associate, with each of the VMs, a tenant; and perform the backup operation for one or more of the VMs associated with a first tenant on a first computing node before performing the backup operation for one or more VMs associated with a second tenant on the first computing node.

16. The VM backup server device of claim 12 wherein the backup set logic is further configured to:

determine whether the hypervisor is configured for API (Application Programming Interface) access with the hypervisor guest, and responsive to a determination that the hypervisor is configured for API access, receive an indication from the hypervisor guest indicative of an allocated or changed status for the file blocks on each disk.

17. The VM backup server device of claim 12 wherein the backup set logic is further configured to:

iterate through the prioritized sequence of operations;

determine whether the hypervisor guest is configured for change block tracking, and if so;

determine whether the hypervisor guest performs change block tracking at a disk level for the file blocks on a disk, and identify the set of file blocks via disk level change block tracking, and if not;

perform change block tracking to identify the set of file blocks via file system level change block tracking.

18. The VM backup server device of claim 12 wherein the backup set logic is further configured to, based on the determination of whether the hypervisor guest is configured for change block tracking, perform a snapshot of each of a plurality of disks in communication with the hypervisor guest;

determine a file system associated with each partition or logical volumes on the plurality of disks;

for each file system, read an allocation bitmap and determine a block offset for each changed the block, and store each changed the block based on the determined block offset.

19. The VM backup server device of claim 12 wherein the backup set logic is further configured to, when the hypervisor guest is unable to determine the changed the blocks, perform a snapshot of the and identify whether a full or incremental change has occurred based on at least one of the snapshot and a previous snapshot.

20. A computer program product on a non-transitory computer readable storage medium having instructions that, when executed by a processor, perform a method of backing up VMs (virtual machines), the method comprising:

identifying a plurality of computing nodes, each having at least one VM, each of the VMs responsive to a hypervisor operating on one or more of the plurality of computing nodes;

determining, for each of the VMs, a set of file blocks corresponding to the one or more of the VMs for inclusion in a backup operation comprising at least one of a full backup and an incremental backup for restoring each of the VMs, the set of the blocks identified according to a prioritized sequence of operations based on a storage array connected to one or more of the plurality of computing nodes, wherein one operation of the prioritized sequence of operations comprises:

identifying a list of changed file blocks included in the storage array and;

invoking a hypervisor guest installed on one or more of the VMs to track changes between backup points to identify changed file blocks;

responsive to identifying the changed file blocks, identifying the set of file blocks associated with the changed file blocks, the set of the blocks selected at a common point in time associated with each of the VMs; and storing the set of file blocks in a backup format, the backup format configured for restoring one or more of the VMs corresponding to the set of file blocks to a same point in time.

* * * * *